US009117112B2

(12) United States Patent
Carpenter et al.

(10) Patent No.: US 9,117,112 B2
(45) Date of Patent: Aug. 25, 2015

(54) BACKGROUND DETECTION AS AN OPTIMIZATION FOR GESTURE RECOGNITION

(71) Applicant: Google Inc., Mountain View, CA (US)

(72) Inventors: Thor Carpenter, Snoqualmie, WA (US); Frank Petterson, Redwood City, CA (US); Janahan Vivekanandan, Los Altos, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/485,186

(22) Filed: Sep. 12, 2014

(65) Prior Publication Data

US 2015/0003727 A1    Jan. 1, 2015

Related U.S. Application Data

(63) Continuation of application No. 13/589,209, filed on Aug. 20, 2012, now abandoned, which is a continuation-in-part of application No. 13/349,217, filed on Jan. 12, 2012, now Pat. No. 8,594,423.

(51) Int. Cl.
*G06K 9/00* (2006.01)
*G06K 9/48* (2006.01)
(Continued)

(52) U.S. Cl.
CPC .......... *G06K 9/00335* (2013.01); *G06T 7/0081* (2013.01); *G06T 7/0087* (2013.01); *G06T 2207/10016* (2013.01); *G06T 2207/10024* (2013.01); *G06T 2207/20016* (2013.01); *G06T 2207/20144* (2013.01)

(58) Field of Classification Search
None
See application file for complete search history.

(56) References Cited

U.S. PATENT DOCUMENTS

| 6,912,313 B2 * | 6/2005 | Li | 382/219 |
| 6,959,099 B2 * | 10/2005 | Gutta et al. | 382/100 |
| 7,598,977 B2 * | 10/2009 | Ryall et al. | 348/143 |

(Continued)

FOREIGN PATENT DOCUMENTS

EP    0959625 A2    11/1999

OTHER PUBLICATIONS

Zhu et al Detecting video events based on action recognition in complex scenes using spatio-temporal descriptor, Proceeding MM 2009 Proceedings of the 17th ACM international conference on Multimedia, pp. 165-174.*

(Continued)

*Primary Examiner* — Andrae S Allison
(74) *Attorney, Agent, or Firm* — Fish & Richardson P.C.

(57) ABSTRACT

Methods and systems are provided allowing for background identification and gesture recognition in video images. A computer-implemented image processing method includes: receiving, using at least one processing circuit, a plurality of image frames of a video; constructing, using at feast one processing circuit, a plurality of statistical models of the plurality of image frames at a plurality of pixel granularity levels; constructing, using at least one processing circuit, a plurality of probabilistic models of an input image frame at a plurality of channel granularity levels based on the plurality of statistical models; merging at least some of the plurality of probabilistic models based on a weighted average to form a single probability image; determining background pixels, based on a probability threshold value, from the single probability image; and determining whether the plurality of image frames, when examined in a particular sequence, conveys a gesture by the object.

20 Claims, 9 Drawing Sheets

(51) Int. Cl.
*G06K 9/40* (2006.01)
*G06T 7/00* (2006.01)

(56) References Cited

U.S. PATENT DOCUMENTS

| | | | |
|---|---|---|---|
| 7,676,081 B2* | 3/2010 | Blake et al. | 382/164 |
| 7,720,283 B2 | 5/2010 | Sun et al. | |
| 8,073,254 B2* | 12/2011 | Saptharishi et al. | 382/173 |
| 8,116,527 B2 | 2/2012 | Sabol et al. | |
| 8,594,423 B1* | 11/2013 | Carpenter | 382/171 |
| 2006/0126933 A1 | 6/2006 | Porikli | |
| 2007/0183663 A1 | 8/2007 | Wang et al. | |
| 2008/0077953 A1 | 3/2008 | Fernandez et al. | |
| 2009/0290752 A1* | 11/2009 | Kalva | 382/100 |
| 2011/0026812 A1 | 2/2011 | Ikeda | |
| 2011/0102539 A1 | 5/2011 | Ferren | |
| 2013/0308856 A1* | 11/2013 | Carpenter et al. | 382/164 |

OTHER PUBLICATIONS

Brkic et al., "Histogram-Based Description of Local Space-Time Appearance", Lecture Notes in Computer Science, vol. 6688, pp. 206-217, May 3, 2011.
International Searching Authority, International Search Report in International application No. PCT/US2013/055584, Nov. 7, 2013.
Ma et al., "Detecting Motion Object by Spatio-Temporal Entropy", IEEE International Conference on Multimedia and Expo, pp. 265-268, Aug. 22, 2001.
Zhu et al, Detecting Video Events Based on Action Recognition in Complex Scenes Using Spatio-Temporal Descriptor, 2009 Proceedings of the 17th ACM international conference on Multimedia, pp. 165-174.
International Preliminary Report on Patentability in International Application No. PCT/US2013/055584, mailed Mar. 5, 2015, 9 pages.

* cited by examiner

BACKGROUND DETECTION AS AN OPTIMIZATION FOR GESTURE RECOGNITION

CROSS-REFERENCE TO RELATED APPLICATIONS

This application is a continuation application of U.S. application Ser. No. 13/589,209, filed on Aug. 20, 2012, entitled "Background Detection as an Optimization for Gesture Recognition," the entire disclosure of which is incorporated herein by reference and which is a continuation-in-part application of U.S. application Ser. No. 13/349,217, filed on Jan. 12, 2012, and entitled "Automatic Background Identification in Video Images," the entire disclosure of which is incorporated herein by reference.

BACKGROUND

This specification relates generally to image processing, and particularly to video image processing.

The Internet provides access to a wide variety of resources, such as video files, audio files, pictures, business and personnel contact information, product information, maps, and news articles. Although textual data were prevalent during early days of the Internet, video file transfers and video communications are becoming more popular with the increase in bandwidth.

In video chat and other digital video applications, a computer must process significant quantities of data in real time to create a high-quality and temporally-accurate image. For instance, if a person or object in a video conference call is moving a significant amount and is positioned in front of a variety of articles that create a complex background image, both the computer transmitting the video frame data and the computer receiving the data are confronted with enormous data-processing tasks.

As the image most likely of interest in a video application is often the person or object that is exhibiting the most movement, it is desirable that this person or object appear in as high-quality a resolution as is possible given the computing restraints. Accordingly, it is often desirable to segment the video into background and foreground layers. Applications of segmented layers includes subtracting the background layer to present only the foreground layer, person, or object for analysis (including for video surveillance, for example), and/or replacing the background layer with an alternative background image or layer, among many other applications. For convenience to the user, it is desirable that the selection and subtraction of the foreground or background layer be performed automatically and updated in real-time without user intervention.

It is similarly desirable that gesture recognition be performed automatically and updated in real-time without user intervention. Gesture recognition often involves a multi-step process, including the real-time processing of video frames, segmentation of the frame into foreground components (e.g. hands, arms, etc.), tracking of those foreground components, and inferring an action from a sequence of foreground motions. Accordingly, gesture recognition is usually a computation-heavy and error-prone process. It is desirable that gesture recognition be performed automatically and in a computationally-efficient manner without user intervention.

BRIEF SUMMARY

Systems and computer-implemented methods for recognizing a gesture made by an object. According to one aspect, a computer-implemented image processing method for recognizing a gesture made by an object includes: receiving, using at least one processing circuit, a plurality of image frames of a video, wherein each pixel of each of the plurality of image frames has a blue channel, a green channel, a red channel, and an alpha channel; constructing, using at least one processing circuit, a plurality of statistical models of the plurality of image frames at a plurality of pixel granularity levels, the plurality of statistical models including: at a first pixel, granularity level, a spatio-temporal (S-T) histogram for each of the pixels from the plurality of image frames, wherein a first axis of the S-T histogram represents channel value bins, and wherein a second axis of the S-T histogram represents counts of image frames per bin; at a second pixel granularity level higher than the first pixel granularity level, aggregate histograms for the blue, green, and red channels, respectively, based on aggregated pixel values at the second pixel granularity level; constructing, using at least one processing circuit, a plurality of probabilistic models of an input image frame at a plurality of channel granularity levels based on the plurality of statistical models, the plurality of probabilistic models including: at a first channel granularity level, a probability image from each of the S-T histogram and the aggregate histograms, wherein each of the probability images comprises a plurality of pixels each indicating a probability of a corresponding pixel in the input image being a background pixel; at a second channel granularity level higher than she first channel granularity level, compact probability images from the probability images at the first channel granularity level; merging the compact probability images based on a weighted average to form a single probability image: subsampling pixels in the single probability image; determining background pixels, based on a probability threshold value, from the subsampled single probability image; and determining whether the plurality of image frames, when examined in a particular sequence, conveys a gesture by the object.

In one implementation, the method further includes determining whether a gesture by the object resembles a predetermined gesture.

In one implementation, the method further includes determining foreground pixels, based on a probability threshold value, from the subsampled single probability image.

In one implementation, the method further includes automatically replacing the determined background pixels with desired pixel values.

In one implementation, the method further includes automatically removing the determined background pixels.

In another aspect, a computer-implemented image processing method for recognizing a gesture made by an object includes: receiving, using at least one processing circuit, a plurality of image frames of a video; construction, using at least one processing circuit, a plurality of statistical models of the plurality of image frames at a plurality of pixel granularity levels; constructing, using at least one processing circuit, a plurality of probabilistic models of an input image frame at a plurality of channel granularity levels based on the plurality of statistical models; merging at least some of the plurality of probabilistic models based on a weighted average to form a single probability image; determining background pixels, based on a probability threshold value, from the single probability image; and determining whether the plurality of image frames, when examined in a particular sequence, conveys a gesture by the object.

In one implementation, the plurality of statistical models comprise: at a first pixel granularity level, a spatio-temporal (S-T) histogram for each of the pixels from the plurality of image frames, wherein a horizontal axis of the S-T histogram represents channel value bins, and wherein a vertical axis of the S-T histogram represents counts of image frames per bin; and at a second pixel granularity level higher than the first pixel granularity level, aggregate histograms for the blue, green, and red channels, respectively, based on aggregated pixel values at a the higher pixel granularity level.

In one implementation, the plurality of probabilistic models comprise: at a first channel granularity level, a probability image from each of the S-T histogram and the aggregate histograms, wherein each of the probability images comprises a plurality of pixels each indicating a probability of a corresponding pixel in the input image being a background pixel; and at a second channel granularity level higher than the first channel granularity level, compact probability images from the probability images at the single-channel granularity level.

In one implementation, the compact probability images are obtained from one of a mean, a median, or a minimum operation over the probability images at the first channel granularity level for a plurality of channels, wherein the first channel granularity level is a single-channel granularity level.

In one implementation, the compact probability images include: a compact S-T probability image at the first pixel granularity level and the second channel granularity level; a compact aggregate background probability image at the second pixel granularity level across a first-order approximation of a background region and at the second channel granularity level; and a compact aggregate foreground probability image at the second pixel granularity level across a first-order approximation of a foreground region and at the second channel granularity level, wherein the compact S-T probability image is given a higher weight in the weighted average.

In one implementation, the weighted average gives a higher weight to the probabilistic models at a lower pixel granularity level.

In one implementation, the method further includes: subsampling pixels in the single probability image, wherein the background pixels are determined from the subsampled single probability image.

In one implementation, the method further includes automatically replacing the determined background pixels with desired pixel values.

In one implementation, the method further includes alpha-blending the determined background pixels with foreground pixels.

In one implementation, each pixel of each of the plurality of image frames has a blue channel, a green channel, a red channel, and an alpha channel.

In one implementation, each pixel of each of the plurality of image frames has a blue channel, a green channel, and a red channel.

In one implementation, the method further includes: adding and subtracting image frames to the plurality of image frames and updating the plurality of statistical models and the plurality of probabilistic models based on the plurality of image frames with the added and subtracted image frames.

In one implementation, the method further includes sampling one of the plurality of image frames at a probability equal to a desired statistics update frequency.

In another aspect, art image processing system comprises at least one processing circuit configured to: receive a plurality of image frames of a video; construct a plurality of statistical models of the plurality of image mantes at a plurality of pixel granularity levels; construct a plurality of probabilistic models of an input image frame at a plurality of channel granularity levels based on the plurality of statistical models; merge at least some of the plurality of probabilistic models based on a weighted average to form a single probability image; determine background pixels, based on a probability threshold value, from the single probability image; and determine whether the plurality of image frames, when examined in a particular sequence, conveys a gesture by an object within the frames.

In one implementation, the plurality of statistical models comprise: at a first pixel granularity level a spatio-temporal (S-T) histogram, for each of the pixels from the plurality of image frames, wherein a first axis of the S-T histogram represents channel value bins, and wherein a second axis of the S-T histogram represents counts of image frames per bin; and at a second pixel granularity level higher than the first pixel granularity level, aggregate histograms for the blue, green, and red channels, respectively, based on aggregated pixel values at a the second pixel granularity level.

In one implementation, the plurality of probabilistic models comprise: at a first channel granularity level, a probability image from each of the S-T histogram and the aggregate histograms, wherein each of the probability images comprises a plurality of pixels each indicating a probability of a corresponding pixel in the input image being a background pixel; and at a second channel granularity level higher than the first channel granularity level, compact probability images from the probability images at the single-channel granularity level.

In one implementation, the compact probability images are obtained front one of a mean, a median, or a minimum operation over the probability images at the first channel granularity level for a plurality of channels.

In one implementation, the system the compact probability images include: a compact S-T probability image at the first pixel granularity level and the second channel granularity level; a compact aggregate background probability image at the second pixel granularity level across a first-order approximation of a background region and the second channel granularity level; and a compact aggregate foreground probability image at the second pixel granularity level across a first-order approximation of a foreground region and the second channel granularity level, wherein the compact S-T probability image is given a higher weight in the weighted average.

In one implementation, the system is configured to determine whether a gesture by the object resembles a predetermined gesture.

In one implementation, the system is configured to determine foreground pixels, based on a probability threshold value, from the subsampled single probability image.

In one implementation, the system is configured to replace the determined background pixels with desired pixel values.

In one implementation, the system is configured to remove the determined background pixels.

It should be appreciated that all combinations of the foregoing concepts and additional concepts discussed in greater detail below (provided such concepts are not mutually inconsistent) are contemplated as being part of the implementations disclosed herein. In particular, all combinations of claimed subject matter appearing at the end of this disclosure are contemplated as being part of the implementations disclosed herein. It should also be appreciated that terminology explicitly employed herein that also may appear in any disclosure incorporated by reference should be accorded a meaning most consistent with the particular concepts disclosed herein.

The foregoing and other aspects, embodiments, and features of the present teachings can be more fully understood from the following description in conjunction with the accompanying drawings.

BRIEF DESCRIPTION OF THE DRAWINGS

The skilled artisan will understand that the figures, described herein, are for illustration purposes only. It is to be understood, that in some instances various aspects of the described subject matter may be shown exaggerated or enlarged to facilitate an understanding of the described subject matter. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.

DETAILED DESCRIPTION

Figure 1:
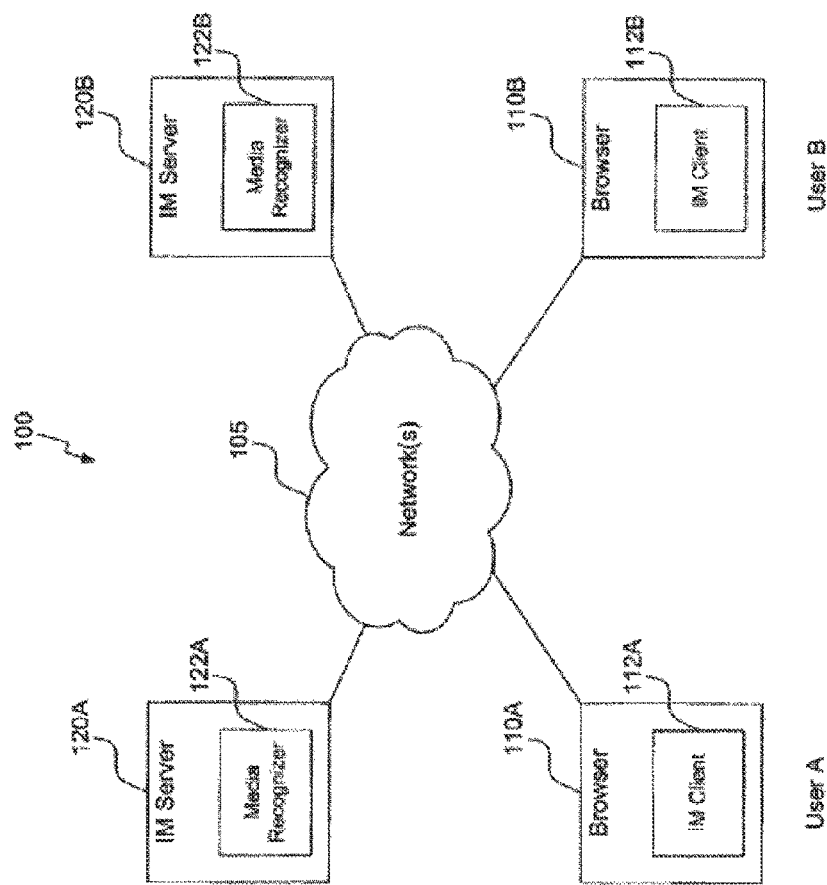
FIG. 1 is a block diagram illustrating an example messaging communication environment.

Following below are more detailed descriptions of various concepts related to, and embodiments of, methods and systems for image processing and gesture recognition. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Recent advances in computer networking and processing make images easily Accessible. One aspect of the image processing involves detection and alteration of objects and/or background of an image.

For example, in one area of application, public access of images, especially images containing human faces raises concerns about privacy. To protect the privacy of people appearing in an image, their faces may be altered to become unrecognizable to obscure their identities. To obscure a face in an image, a region containing the face can first be identified. Automatic face detection techniques can help to identity face regions when processing a large number of images. The detected face region in the image may be replaced by a replacement shape with solid color or mosaics. In an implementation, a face or object may be hidden or replaced with an "expected" background image for that region. The expected background region can be obtained from the S-T histogram pixel values with maximal probability at each pixel as described in detail below. Users viewing the modified image may not be aware that an object/face was removed.

In another area of application, video surveillance systems can be deployed at homes, office buildings, and other locations and can automatically detect moving objects with respect to the background. The detection of the moving objects may be based on frame-to-frame comparison of the video images. Digital signal processing (DSP) chips may be used in these image processing applications.

In other areas of application, such as in a video chat, it may be desirable to replace one background with an alternate background image. A background image can be manually selected, far example, by requiring the user to first move out of the video frame. In addition, when the background changes, such as when the lighting level changes, or when the video camera changes its location/angle, the background may need to be reset manually.

According to an implementation described herein, automatic segmentation of foreground and background within a video frame can be performed, and the background can be automatically determined and updated in real-time without user intervention.

Implementations disclosed herein can also be used to process images displayed on an Internet television (TV) or web TV, or with a smart TV system. In an Internet TV or web TV environment, a personal computer or a mobile device can be used to stream or download media programs over the Internet. In a smart TV system, a smart TV module (or connected TV module, hybrid TV module, etc.) can integrate a conventional TV set with the Internet, and can bring a more integrated experience to users. A user can select desired content to view on the smart TV, play games over the Internet, browse web pages, etc., and may not necessarily discern whether the content is from broadcasting, as in a conventional TV, or is from the Internet.

The smart TV may include a processing circuit configured to integrate internet connectivity with more traditional TV programming sources (e.g., received via cable, satellite, over-the-air, or other signals). The smart TV module may be physically incorporated into a TV set or may include a separate device such as a set-top box (STB). Blu-ray or other digital media player, game console, hotel TV system, or other companion devices.

A smart TV module may be configured to allow viewers to search and find videos, movies, photos and other content on the web, on a local cable TV channel, on a satellite TV channel, or stored on a local storage device. A STB or set-top unit (STU) may include an information appliance device that may contain a tuner and connect to a TV set and an external signal source, turning the signal into content which is then displayed on the TV screen or other display device.

Other applications, such as video compression, encoding/decoding, and online video downloading/viewing, can also take advantage of the implementations disclosed herein.

In the following, an video chat environment is used as an example application of the background detection implementations disclosed herein. It should be understood that the implementations are not limited to video chatting. Those skilled in the art with access to the teachings provided herein wilt recognize additional modifications, applications, and embodiments within the scope thereof and additional fields in which the implementations would be of significant utility.

The emergence and development of computer networks and protocols, including the World Wide Web (or simply "the web"), now allows many remote users to communicate with one another. Different types of communication tools have been developed for the web which allow users to communicate in different ways through a browser. One popular type of communication tool is instant messaging (also called chat). Instant messaging (IM) allows users to communicate over the web in real time. A user uses a client program (called an IM client) that communicates with an instant messaging service over the web. The IM client has a graphical user-interface (GUI) that allows a user to input text and view text. With the increase of the network speed, video chat and video teleconferencing are becoming more popular.

FIG. 1 is a diagram of an example system 100 for viewing media content in instant messaging between two users A and B. System 100 may include a browser 110A coupled to an IM server 120A over one or more networks 105. Browser 110A may further include an IM client 112A. A browser 110B may also be coupled to an IM server 120B over one or more networks 105. Browser 110B may further include an IM client 112B. IM server 120A may be further coupled to IM server 120B over one or more networks 105.

Network(s) 105 can be any network or combination of networks that can carry data communication. Such network (s) 105 can include, but are not limited to, a local area network (LAN), medium area network, and/or wide area network (WAN) such as the internet. Network(s) 105 can support protocols and technology including, but not limited to, World Wide Web protocols and/or services. Intermediate web servers, gateways or other servers may be provided between browsers 110A, 110B and IM servers 120A, 120B, and between IM servers 120A, 120B depending upon a particular application or environment.

Client browsers 110A, 110B and IM clients 112A, 112B can be implemented in software, firmware, hardware, or any combination thereof. Client browsers 110A, 110B and IM clients 112A, 112B can be implemented to run on any type of processing device including, but not limited to, a computer, workstation, distributed computing system, embedded system, stand-alone electronic device, networked device, mobile device, set-top box, television, or other type of processor or computer system. Client browsers 110A, 110B and IM clients 112A, 112B can also be used in a variety of applications in combination with instant messaging (or in instant messaging alone).

Similarly, IM servers 120A, 120B and media recognizers 122A, 122B can be implemented in software, firmware, hardware, or any combination thereof. IM servers 120A, 120B and media recognizers 122A, 122B can be implemented to run on any type of processing device including, but not limited to, a computer, workstation, distributed computing system, embedded system, stand-alone electronic device, networked device, mobile device, set-top box, television, or other type of processor or computer system. IM servers 120A, 120B and media recognizers 122A, 122B can also be used in a variety of applications in combination with instant messaging (or in instant messaging alone).

System 100 can be used is a stand-alone system or in connection with a search engine, web portal, or ether web site to allow remote users to engage in instant messaging with video viewing. IM servers 120A, 120B can operate alone or in tandem with other servers, web servers, or devices and can be part of any search engine, portal, or web site.

In operation, IM server 120A may manage instant messaging with IM client 110A. IM server 120B may manage instant messaging with IM client 110B. When user A and user B begin chatting, IM clients 110A, 110B each may provide user-interfaces that can include conversation windows for users A and B to input their respective chat text and/or video images and sound. Optional presence information may also be made available so that users A and B know if they each are available to chat (or if others are available to chat).

As the users chat, IM clients 112A, 112B may pass chat messages to respective IM servers 120A, 120B. The chat messages may be forwarded between IM servers 120A, 120B, and from there, forwarded to respective IM clients 110A, 110B. Chat messages may then be displayed by IM clients 110A, 110B for users A and B to view.

Figure 2:
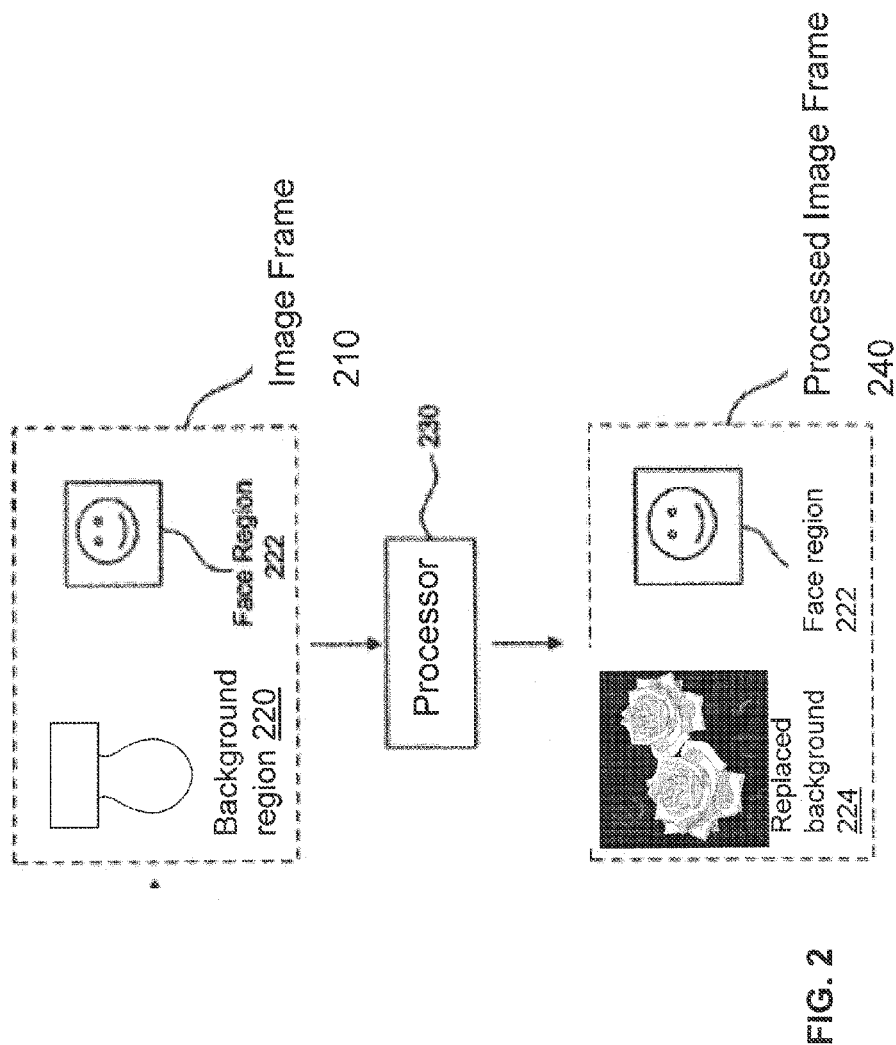
FIG. 2 illustrates processing of a video image frame to automatically replace the background according to an embodiment.

In FIG. 2, it is shown that a video image frame 210 can be captured by a video camera such as a webcam. The image frame 210 may include a background region 220 and a foreground (e.g., face) region 222. The video camera, particularly a low-cost webcam, may cause the color values in the image frame 210 to oscillate, and blur the foreground and the background.

In one implementation, the image frame 210 may be processed by a processor 230 of the user computer. The face region 222 may remain substantially the same after the processing, yet the background region 220 may be automatically replaced with a desired background 224, which may include snore appealing pictures, predetermined background patterns and colors, or with different colors and brightness, etc. The processed image frame 240 with the replaced background 224 may be sent over the network for the other user(s) to view.

Figures 3A, 3B:
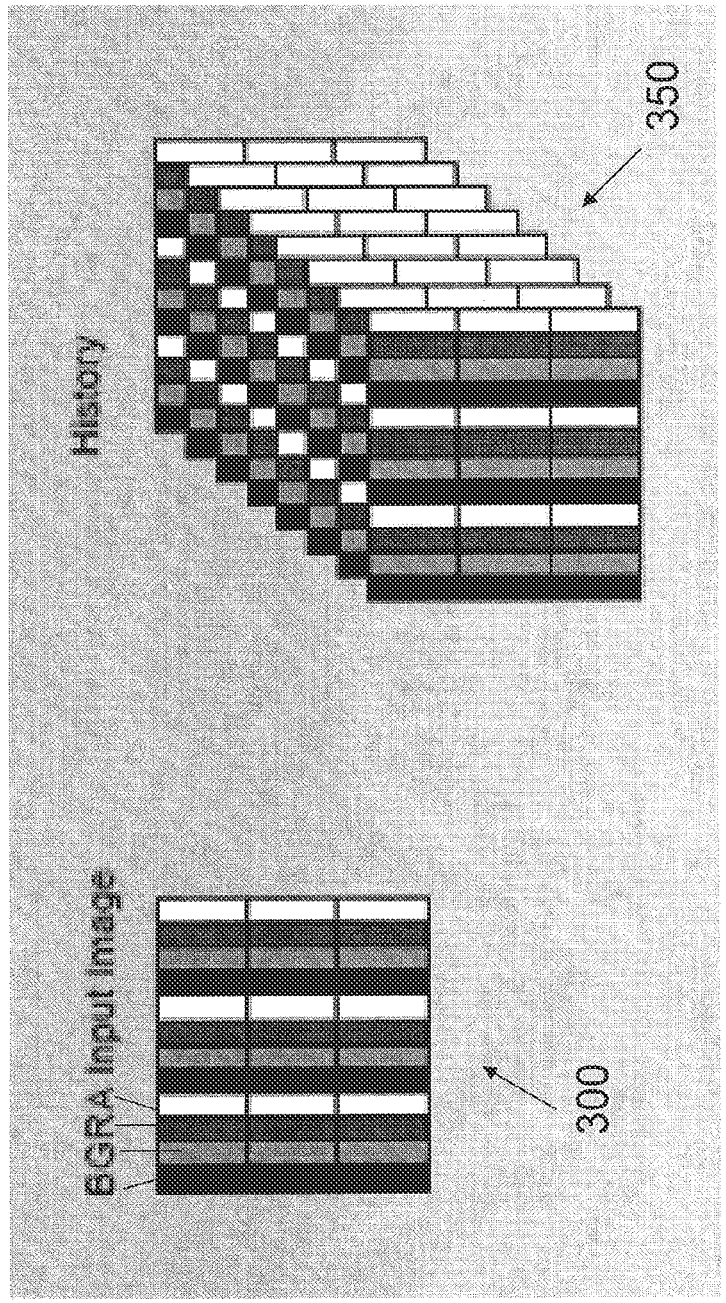
FIG. 3A illustrates a single video image frame having a plurality of channels according to an embodiment.
FIG. 3B illustrates a series of video image frames according to an embodiment.

Each image frame includes a plurality of pixels. A pixel element stores color information for the pixel, and may additionally have an "alpha channel" storing data indicating, for example, the opaqueness of the pixel. As illustrated in FIG. 3A, a video image frame 300 may include a plurality of pixels each having a blue ("B"), a green ("G"), a red ("R"), and an alpha ("A") channel. As illustrated in FIG. 3B, a video 350 may include a sequence of frames 300.

Each frame may include foreground (e.g., objects such as the face of a user), and background (e.g., objects, that may be stationary) in the video scene.

In one implementation, by analyzing the frame sequence, a per-pixel background model, can be built. Given a new frame, for each pixel P in the frame, a probability for P being a background pixel can be computed. If this probability is above a predetermined threshold, it is considered a background pixel, otherwise it is considered a foreground pixel.

If P is determined to be a background pixel, according to one implementation, its color value may be replaced with a color value from a predetermined background image at the corresponding pixel location.

Alternative to replacing the pixel value, the frame and the background image can be alpha blended to produce transparency effects, based on the probability of P, to thereby facilitate smoother transitions between background and foreground pixels.

In one implementation, the background model comprises a bounded history of video frames, a spatio-temporal (S-T) histogram, a foreground color aggregate histogram, a background color aggregate histogram, per-pixel probability calculations for a given frame and subsampled layers of the probability images. These components are described in more detail below.

Figure 4:
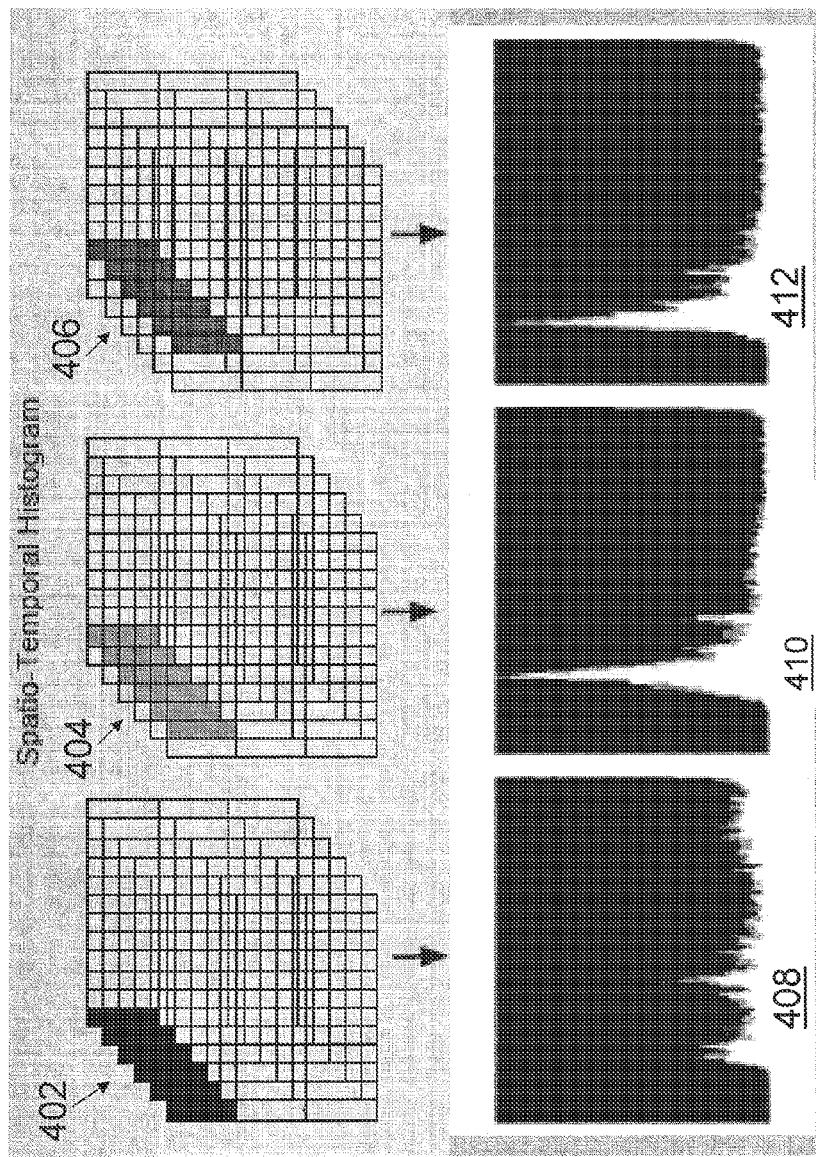
FIG. 4 illustrates spatio-temporal histograms of blue, green, and red channels according to an embodiment.

In one implementation, a plurality of S-T histograms can be computed from a history of frames 350, where each channel (blue, green, red, alpha) of each pixel has its own histogram. In an example as illustrated in FIG. 4, histories of blue channel 402, green channel 404, and red channel 406 of the pixel in the upper left corner of the frame can be used to construct their respective histograms 408, 410, and 412. It is noted that the histograms shown in the lower portion of FIG. 4 are for illustration purpose only, and do not necessarily true histograms computed from image frames 402, 404, 406 shown in the upper portion of FIG. 4.

In one example, a number of N=200 frames are used to build the histograms. In the histograms, a first axis (e.g., the horizontal axis) represents the bins of channel values, and a second axis (e.g., the vertical axis) represents the counts of frames per bin The bins can have different resolutions. For example, for a channel value range of 0-255, the values can be binned with a resolution of 1 unit value, resulting 256 bins on the horizontal axis. In another example, the channel values can be binned with a resolution of 8 unit values, resulting in 32 bins on the horizontal axis. Aggregated histograms (as described in detail below) may have much larger bins than the S-T histograms. For example, the bins can be represented by 64-bit unsigned integers.

In a first order of approximation, the pixels contributing to the peaks in the histograms 408, 410, and 412 may be considered background pixels, because their values remain substantially the same in a large number frames, indicating a lack of motion. As described in detail below, whether a pixel is considered to be a background pixel can be described probabilistically based on the histograms. The BGR channels can be combined, for example by taking the mean of the three probabilities obtained from the three histograms. Alternatively, a minimum, or a second lowest value, or ether statistical methods can be used to reduce the three channel values to a single pixel value for comparison with a probability threshold.

An array of histograms can thus be built, and may be stored in the user computer's memory. A BGRA video frame of a width W and a height H can thus have W*H*4 histograms. In some other implementations, the alpha channel is not stored, and the BGR video frame would have W*H*3 histograms. Video frames using color channels other than BGR channels can also be adopted.

These S-T histograms may be considered a first layer of statistical models of the series of image frames at a first pixel granularity level, e.g., single-pixel granularity level because there is no aggregation in the physical dimensions across pixels.

Image operations including "add" and "subtract" can be employed in incorporating or removing an image from an S-T histogram. To add (subtract) an image to (from) the S-T histogram, for each channel value in each pixel and each corresponding histogram, the histogram bin index can be computed by dividing the channel value by the number of bins and incrementing (decrementing) the corresponding bin of the histogram.

The subtraction of data allows historical data substantially different from the present values to be removed from the statistics, thereby removing bias caused by an event during the history, such as when the video camera is moved. Without subtracting the data associated with an old camera position/angle, a permanent residue or bias may be included in the processed images. One can also add (subtract) to a counter of the number of images incorporated in the S-T histogram.

A "probability image" can be obtained by computing a per-channel per-pixel probability of an input image given an S-T histogram. Each channel value may be divided by the number of bins to obtain the bin index in the corresponding histogram. The probability of that channel is then the current counter value of that bin divided by the number of frames incorporated into the S-T histogram. The probability image obtained from the S-T histogram includes probabilistic information of the background at the single-pixel granularity level. In addition, there is no channel (color) aggregation in this probability image, and thus it may be considered as a first layer of probabilistic models at a first channel granularity level (e.g., single-channel granularity level).

Probabilistic models at other layers such as at higher channel granularity levels can be obtained by aggregating the probability images across multiple channels (e.g., colors). For example, a "compact S-T probability image" may be obtained by computing the probability value per pixel from the mean of the blue, green, and red channel probability image values of the corresponding pixel in the probability image. Alternatively, the compact S-T probability image may use the minimum or median operations instead of the mean operation for a more conservative estimate of the compact per-pixel probability. The compact S-T probability image includes probabilistic information of the background at the single-pixel granularity level and at a higher channel granularity level (e.g., with aggregated colors).

Figure 5:
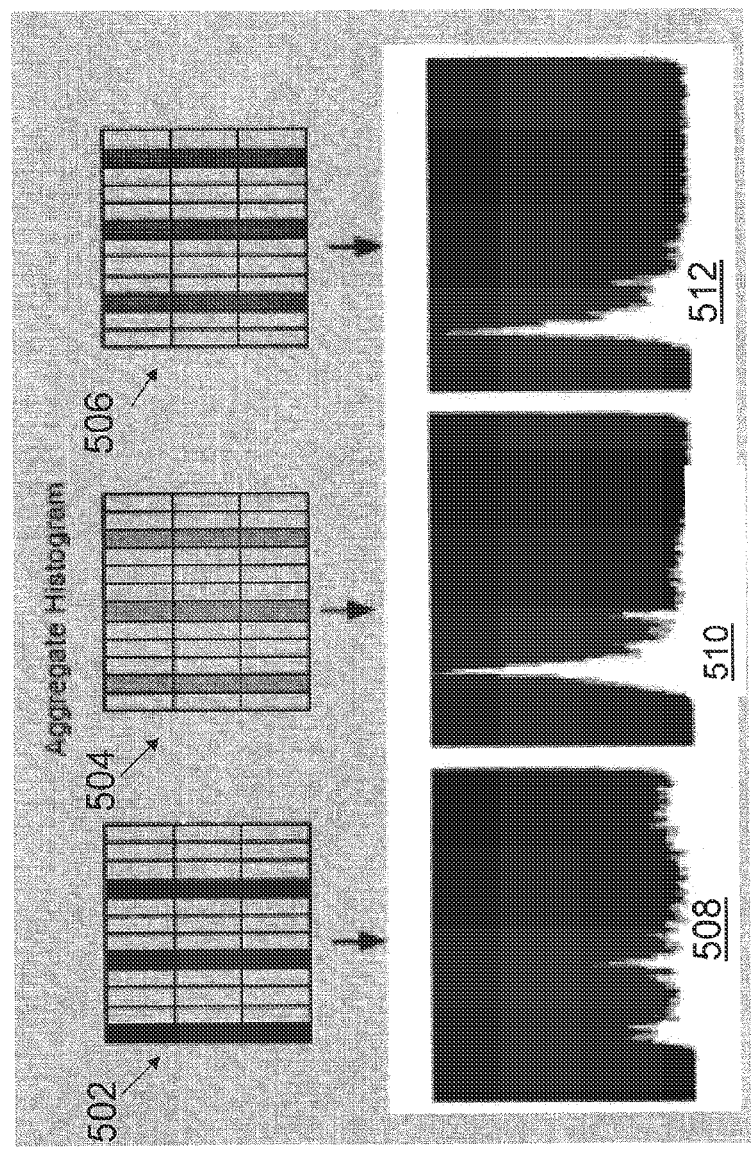
FIG. 5 illustrates aggregate histograms of blue, green, and red channels according to an embodiment.

Referring to FIG. 5, for all the pixels within the image, the blue channels 502, green channels 504, and red channels 506 can have their values aggregated, to construct three aggregated histograms (AHs) 508, 510, 512 for the entire image. These AHs are at the highest pixel granularity level as the pixel values are aggregated across the whole image frame. It is noted that the histograms shown in the lower portion of FIG. 5 are for illustration purpose only, and do not necessarily true histograms computed from image frames 502, 504, 506 shown in the upper portion of FIG. 5.

In some implementations, AHs can be segmented as background AHs and foreground AHs, which are at a pixel granularity level lower than the AHs across the whole image frame, but higher than the single-pixel granularity level of the S-T histograms. The background pixels in an input image can be identified, in a first-order approximation, by comparing the pixels in the corresponding compact probability image described with a probability threshold. The background AHs and foreground AH can be updated on a frame-by-frame basis from the most recent compact probability image as computed from the current S-T histogram.

A Boolean operation can be employed to identify the background pixels. For example, if the pixel values are above the threshold, these pixels may be considered background pixels and used to construct the background AHs. For each pixel in the input image with corresponding compact probability image probability pixel values above the probability threshold if the Boolean is "true" (or below the threshold if the Boolean is "false"), each channel value may be divided by the number of bins in the histogram to compute the bin index, and incrementing (decrementing) the corresponding bin of the respective blue, green or red histogram to obtain the background (foreground) AHs. One can also add (subtract) the number of pixels above (or below if the Boolean is false) the threshold to the total pixel count.

Although at a higher pixel granularity level, these background and foreground AHs are still at a single-channel granularity level because there is no aggregation across channels.

A "compact aggregate probability image" operation can be performed by computing the mean (alternatively, minimum or median) of the channel probability values for each pixel in an input image given the per-channel histograms and the total number of pixels added to the aggregate histogram. The compact aggregate probability image includes probabilistic information of the background at a higher pixel granularity (e.g., global) level.

In some other implementations, the aggregation of pixels may be selected based on geometrical locations. For example, because of the corner portions of an image are more likely to be background rather than foregrounds pixels at the corner portions can be grouped together and treated differently from pixels at other locations. These pixels may have very high probabilities of being background pixels and, if it is almost certain that they are background pixels, then they do not have to be included in the more complex algorithms described above. In an implementation, selected pixel locations (e.g., based on geographical locations in the image, or based on an initial background manually set or input by the user) in the image can be used to generate a prior knowledge background probability, which then may be combined with the compact probability image to bias the pixel background probability for better background identification and/or reduced computation. This combination may be a weighted average or a conditional probability calculation.

A plurality layers of statistical models and probabilistic models can be constructed for multiple pixel granularity levels (ranging from single-pixel granularity level to global level across all pixels) and channel granularity levels (ranging from single-channel granularity level to a level aggregating over all channels). A combined consideration of the different layers of models can improve the quality of the background identified and reduce the computational requirement in the image processing.

During the image processing, a "compact S-T probability image" can be computed using the S-T histogram, and two "compact aggregate probability images" can be computed using foreground and background AHs. All three compact probability images each may have one probability value per pixel.

A single "compact probability image" can be defined as a heuristic merging of these probability images to form a single probability image. A weight can be assigned to each probability image, and a sum of these weights can be computed. The value of each pixel in the resulting "compact probability image" may be computed by taking the corresponding probability value in the three input probability images, multiplying those values by their respective weights, taking the sum and dividing by the sum of the weights.

In one example, let Ws, Wf, Wb, Ps, Pf and Pb be the weights and probability values of a pixel from the S-T, aggregate foreground, and aggregate background compact probability images, respectively. The resulting probability can then be calculated as (Ws*Ps+Wf*(1.0−Pf)+Wb*Pb)/(Ws+Wf+Wb).

In one implementation, a higher weight can be given to the probabilistic models at a lower pixel granularity level. For example, "compact S-T probability image" may be weighted higher than the foreground and background "compact aggregate probability images."

A frame in the video sequence may be chosen to be included in the history of frames at random, with a probability equal to the desired update frequency. This update frequency can be adjusted for the purpose of statistical sampling. The frequency of the S-T histogram updates may be different from that for the AH updates. In one example, the AHs can be updated for every frame, and the S-T histograms can be updated less frequently. As such, camera frequency error may be avoided, and computational power requirement may be reduced.

In one example, a frame sample probability of 0.15 may be chosen when processing a video of 30 frames per second. This may result in an average sampling of 30*0.15=4.5 frames per second. The most recent N randomly sampled frames comprise the history of frames in the background model. For an N=200, it may result in 200/(30*0.15)=44.4 seconds of history.

These parameters are for illustration purposes only, and can be adjusted to achieve the desired results. When a new frame is added to the background model, the S-T histogram may be updated. When the history of video frames is full, the oldest video frame may be subtracted from the S-T histogram and removed from the history, before the new frame is added to the S-T histogram and history. For improved efficiency, caching and reusing frame buffers may be adopted.

When determining the final background probability value of a pixel, the background probability of the surrounding pixels may be considered. To achieve this, the "compact probability image" can be subsampled twice, in a fashion similar to an "image Pyramid."

In one example, a four-pixel, square in the base input image layer may reduce to one pixel in the first subsampling, where the value of the pixel may be the average of the four source pixels. The second subsample can use four source pixels from the first subsample. The final background probability of a pixel can be computed by considering a heuristic weighted average of the three probability image layers with coarser layers having lower weights. This allows the spatial smoothing of the replaced background pixels, and can be useful when one pixel is volatile, but those around it are not.

Variations in the combinations of the above procedures can be made with varying degrees of success. In one implementation, simply using the S-T histogram and history of frames alone may give mediocre results. A less memory-intensive approach, which may give decent results under certain conditions, is to not retain a history of frames and not subtract old frames from the S-T histogram. However, if the camera moves or there is a global illumination change, it may take a very long time to recover, if at all.

Alternatives to the S-T histogram, may include any probabilistic models capable of incrementally adding and removing samples. This includes a Gaussian model (normal distribution) where the mean of a channel value is computed by maintaining a running sum of the channel values and variation is computed by maintaining a running sum of the square of the channel values.

Other subsampling methods may be used, for example through any regional probability analysis adjacent a pixel. This can be compared by iterations of every region surrounding a pixel.

By selecting different parameters such as the threshold in the above descriptions, different properties can be obtained from the images. Changing the parameters on the other hand may influence the stability of the background model and the flexibility to change, two competing goals.

Figure 6:
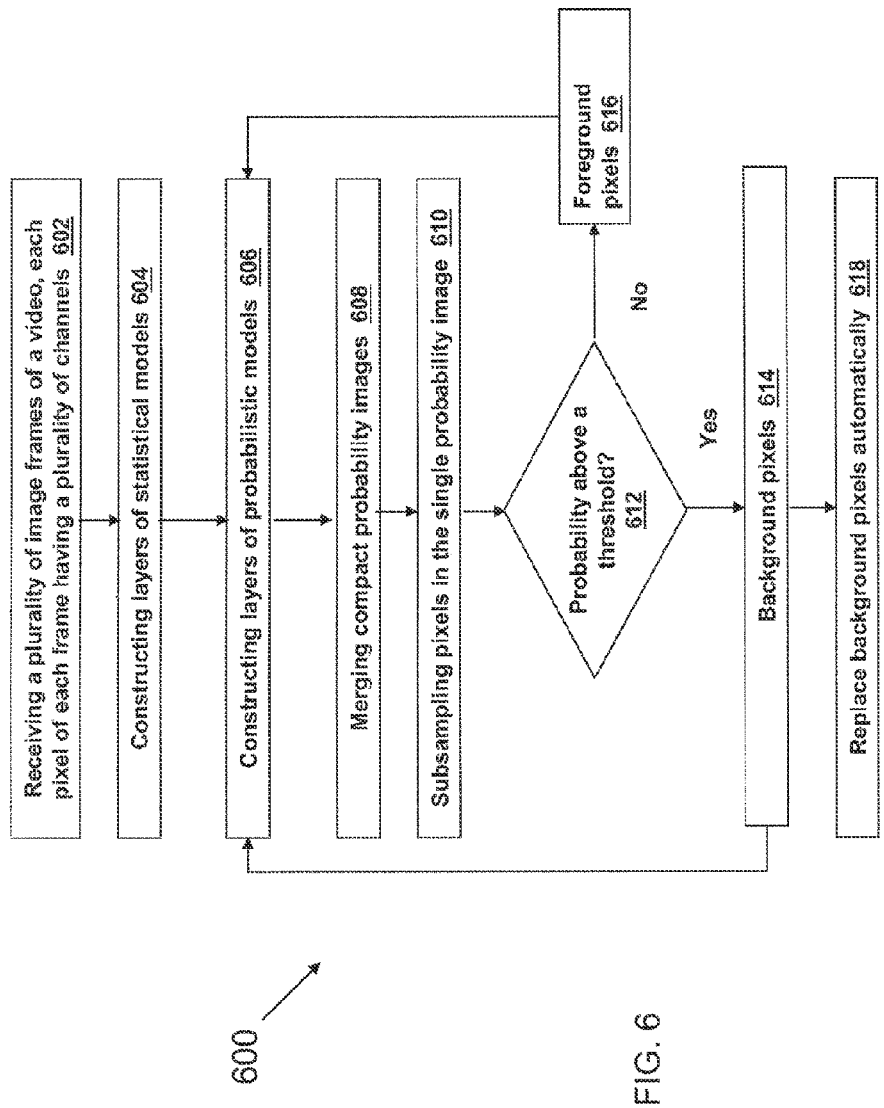
FIG. 6 is a flowchart illustrating an example of method of determining background pixels according to an embodiment.

FIG. 6 is a flowchart illustrating an example method 600 of video image processing according to one implementation.

In an operation 602, the user computer's processor may receive a plurality of image frames of a video, each pixel of each frame having a plurality of channels such as a blue channel, a green channel, a red channel, and an alpha channel.

In an operation 604, a plurality of statistical models of the plurality of image frames are constructed at a plurality of "layers," e.g., pixel granularity levels.

For example, the plurality of statistical models may include, at a single-pixel granularity level, an S-T histogram for each of the pixels front the plurality of image frames, wherein a horizontal axis of the S-T histogram represents channel value bins, and wherein a vertical axis of the S-T histogram represents counts of image frames per bin.

At a higher pixel granularity level, the statistical models may include, for example, aggregate histograms for the blue, green, and red channels, respectively, based on aggregated pixel values at a the higher pixel granularity level. In one example, the higher pixel granularity level is at a global level, taking into account of all pixels in an image frame at a specified channel.

In an operation 606, a plurality of probabilistic models of an input image frame may be constructed at a plurality of "layers," e.g., channel granularity levels.

For example, the plurality of probabilistic models may include, at a single-channel granularity level, a probability image from each of the S-T histogram and the aggregate histograms, wherein each of the probability images comprises a plurality of pixels each indicating a probability of a corresponding pixel in the input image being a background pixel.

At a higher layer or channel granularity level, compact probability images may be constructed from the probability images at the single-channel granularity level.

In an operation 608, the compact probability images may be merged based on a weighted average to form a single probability image.

In an operation 610, pixels in the single probability image may be subsampled to smooth not those more volatile pixels.

In an operation 612, background pixels in an input image can be determined by comparing the corresponding subsampled single probability image pixels with a probability threshold value.

If the probability is higher than the predetermined threshold value, then the pixel is determined to be a background pixel in an operation 614. Otherwise in an operation 616 the pixel is determined to be a foreground pixel.

The background as determined from the above operations can be iteratively computed multiple times for improved quality. For example, the background and foreground determined from operations 614 and 616 can be fed into the operation 606 of constructing probabilistic models. In one example, the background/foreground can be iteratively computed for each pixel in a new frame. The foreground and background AHs can be updated by sampling the frame (e.g., randomly), or include all the pixels in the frame.

In an operation 618, the background pixels can be automatically replaced with desired pixel values without user intervention.

Recent advances in computer networking and processing make images easily Accessible. One aspect of the image processing involves the detection of a gesture in an image or video following the detection and alteration of the background of the image or video.

For example, in one area of application, gesture recognition can be used for automated sign language recognition and interpretation. Automatic sign language recognition techniques can help translate sign language into text.

In another area of application, various remotely-controlled devices can be deployed at homes, office buildings, and other locations and can be controlled by remote gestures rather than direct input. The detection of the user's gesturing is a requirement for control of the remote devices. In one implementation, the user can control a device, program, or system simply by moving the body, such as the eyes, arms, head, or legs, among other parts of the body. Such a device, program, or system could comprise a video or image input as well as one or more gesture recognition algorithms or processing devices.

According to an implementation described herein, automatic segmentation of foreground and background within a video frame can be performed, and the background can be automatically determined—and optionally updated in real-time—without user intervention, and gesture recognition can be performed using the analyzed video frame.

In the following, an video chat environment is used as an example application of the gesture recognition implementations disclosed herein. It should be understood that the implementations are not limited to video chatting. Those skilled in the art with access to the teachings provided herein will recognize additional modifications, applications, and embodiments within the scope thereof and additional fields in which the implementations would be of significant utility, including but not limited to the fields of computer interfacing, remote or virtual controlling, and many other fields.

An image frame generally includes a plurality of pixels. A pixel element stores color information for the pixel, and may additionally have an "alpha channel" storing data indicating, for example, the opaqueness of the pixel. As illustrated to FIG. 3A and described above, a video image frame 300 may include a plurality of pixels each having a blue ("B"), a green ("G"), a red ("R"), and an alpha ("A") channel. As illustrated in FIG. 3B, a video 350 may include a sequence of frames 300. Each frame may include foreground (e.g., objects such as the face, arm, head, or eye of a user, among other things), and background (e.g., objects that may be stationary) in the video scene.

In one implementation, by analyzing the frame sequence, a per-pixel background model can be built. Given a new frame, for each pixel P in the frame, a probability for P being a background pixel can be computed. If this probability is above a predetermined threshold, it is considered a background pixel, otherwise it is considered a foreground pixel. If P is determined to be a background pixel, according to one implementation, the pixel may be removed or its color value may be replaced with a color value from a predetermined background image at the corresponding pixel location.

In one implementation, the background model comprises a bounded history of video frames, a spatio-temporal (S-T) histogram, a foreground color aggregate histogram, a background color aggregate histogram, per-pixel probability calculations for a given frame and subsampled, layers of the probability images. These components are described in more detail above.

Once the probability of each P in a frame being a background pixel is computed, a gesture recognition algorithm can process the image to identify and analyze any gestures or movements. According to one implementation, the frame is processed via any of the above methods or systems in order to remove or replace each pixel P that is above a predetermined threshold (i.e., is a background pixel), and the gesture recognition algorithm uses the modified frame. According to another implementation, the gesture recognition algorithm ignores any pixel P that is determined by any of the above methods or systems to be above a predetermined threshold (i.e., is a background pixel).

Figure 8:
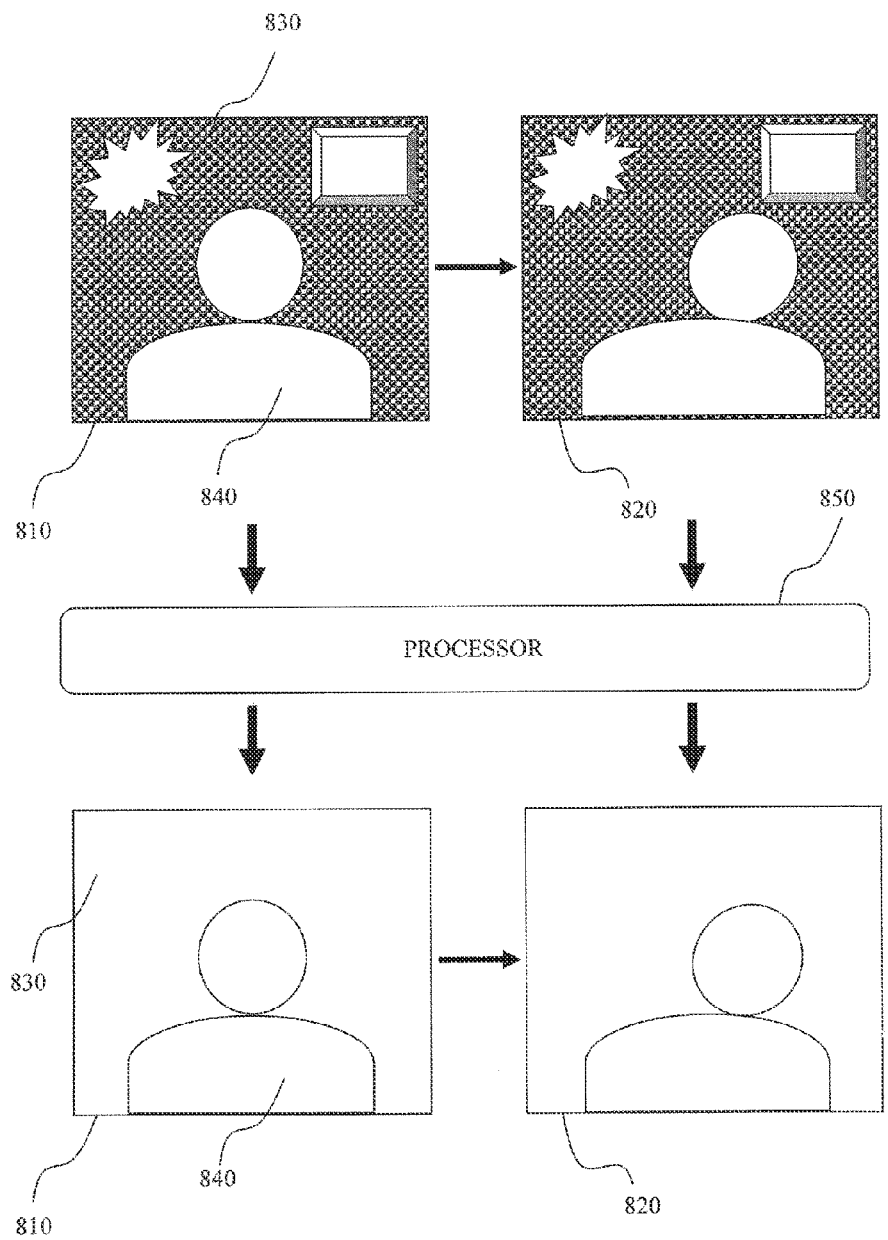
FIG. 8 illustrates processing of a video image frame to automatically recognize one or more gestures according to an embodiment.

In FIG. 8, it is shown that video image frames 810 and 820 can be captured by a video camera such as a webcam. The image frames may include a background region 830 and a foreground (e.g., face, arm, leg, eye, etc.) region 840 at least a portion of which is part of a gesture. For example, in FIG. 8 the head of the figure in the foreground region 840 has tilted to the side in the second frame (which may be directly sequential to the first frame, or the frames can be some selection of non-sequential frames).

In one implementation, the video image frames 810 and 820 may be processed by a processor 850 of, for example, a user computer. The foreground region 840 may remain substantially the same after the processing with the exception of the gesturing, yet the background region 830 may be automatically removed entirely or replaced with a desired background, which may include a background that is more easily processed or ignored by a gesture recognition algorithm, method, or process, or could include more appealing pictures, predetermined background patterns and colors, or with different colors and brightness, etc. The processed video image frames 810 and 820 with the removed or replaced background are then analyzed for gesture recognition.

Figure 9:
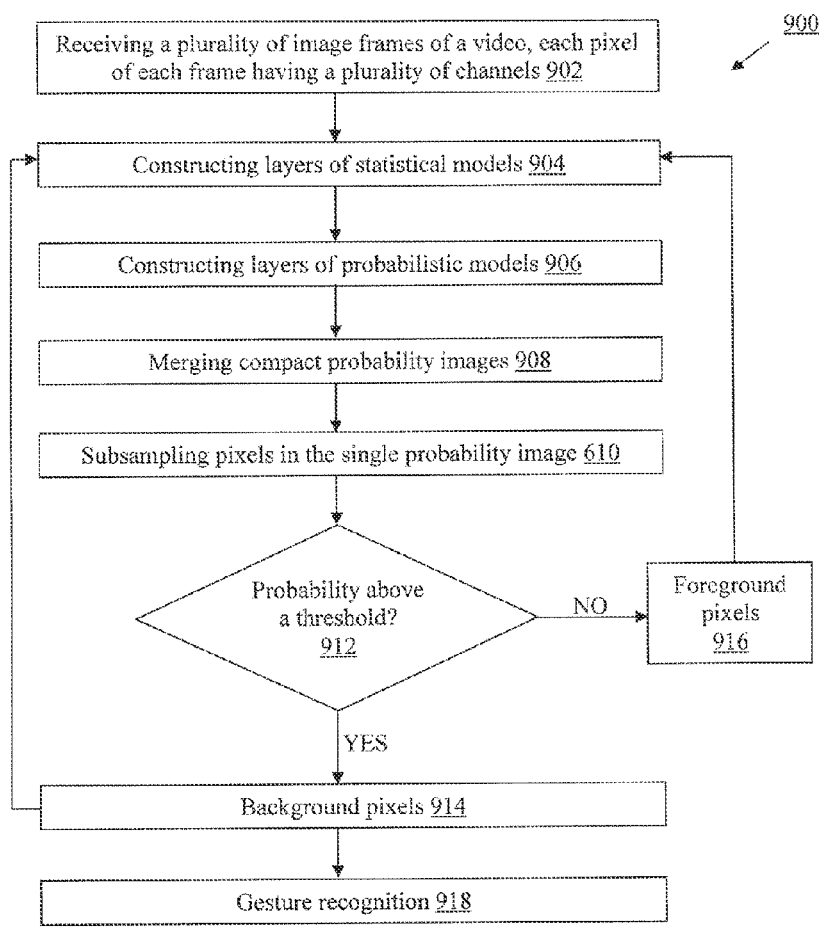
FIG. 9 is a flowchart illustrating an example at method of gesture recognition according to an embodiment.

FIG. 9 is a flowchart illustrating an example method 900 of gesture recognition according to one implementation.

In an operation 902, the user computer's processor may receive a plurality of image frames of a video, each pixel of each frame having a plurality of channels such as a blue channel, a green channel, a red channel, and an alpha channel.

In an operation 904, a plurality of statistical models of the plurality of image frames are constructed at a plurality of "layers," e.g., pixel granularity levels.

For example, the plurality of statistical models may include, at a single-pixel granularity level, an S-T histogram for each of the pixels from the plurality of image frames, wherein a horizontal axis of the S-T histogram represents channel value bins, and wherein a vertical axis of the S-T histogram represents counts of image frames per bin.

At a higher pixel granularity level, the statistical models may include, for example, aggregate histograms for the blue, green, and red channels, respectively, based on aggregated pixel values at a the higher pixel granularity level. In one example, the higher pixel granularity level is at a global level, taking into account of all pixels in an image frame at a specified channel.

In an operation 906, a plurality of probabilistic models of an input image frame may be constructed at a plurality of "layers," e.g., channel granularity levels.

For example, the plurality of probabilistic models may include, at a single-channel granularity level, a probability image from each of the S-T histogram and the aggregate histograms, wherein each of the probability images comprises a plurality of pixels each indicating a probability of a corresponding pixel in the input image being a background pixel.

At a higher layer or channel granularity level, compact probability images may be constructed from the probability images at the single-channel granularity level.

In an operation 908, the compact probability images may be merged based on a weighted average to form a single probability image.

In an operation 910, pixels in the single probability image may be subsampled to smooth out those more volatile pixels.

In an operation 912, background pixels in an input image can be determined by comparing the corresponding subsampled single probability image pixels with a probability threshold value.

If the probability is higher than the predetermined threshold value, then the pixel is determined to be a background pixel in an operation 914. Otherwise in an operation 916 the pixel is determined to be a foreground pixel.

The background as determined from the above operations can be iteratively computed multiple times for improved quality. For example, the background and foreground determined from operations 914 and 916 can be fed into the operation 906 of constructing probabilistic models. In one example, the background/foreground can be iteratively computed for each pixel in a new frame. The foreground and background AHs can be updated by sampling the frame (e.g. randomly), or include all the pixels in the frame.

In an operation 918, any method of gesture recognition can be performed with the background pixels identified. The background pixels can, for example, be ignored by the gesture recognition algorithm or system, can be replaced with something else before or during gesture recognition, or can be otherwise modified.

For example, a gesture recognition algorithm or system can comprise one or more of the following steps: (i) obtaining two or more frames from a video, either sequential or non-sequential frames; (ii) identifying the foreground component(s) in each frame; (iii) tracking the foreground component(s) in multiple frames; and (iv) inferring an action from a sequence of the foreground motions.

In one implementation, the step of identifying the foreground component in each frame can be accomplished simply by removing, via one or more of the methods disclosed herein, all background pixels. The gesture recognition method will require far less computing power because all remaining pixels will be the foreground pixels.

According to another embodiment, the combined compact probability image is used by a gesture recognition method, algorithm, or system as an indicator of which pixels in a frame are background pixels or foreground pixels. All pixels with a probability below a predetermined threshold are identified as foreground pixels and should be included in the gesture recognition analysis. All pixels with a probability above the predetermined threshold are identified as background pixels and should be ignored during the gesture recognition analysis. In one implementation, the combined compact probability image is converted into a bitset mask wherein them is one bit per pixel and that bit is set to true if the corresponding pixel is foreground. The bitset significantly reduces the memory size of the probability image for increased caching efficiency and speed of access.

In one implementation, once a gesture recognition method, algorithm, or system processes the two or more frames and identifies a potential gesture by an object in the frames, that identified gesture can compared to a predetermined list or database of gestures in an attempt to identify or obtain further information shout the gesture. This could include, for example, correlating the shape or other information about the object to an object database, and then correlating the identified gesture to a database of gestures associated with that object. Alternatively, the gesture could be compared to a database of gestures without associating the gesturing object to a known object. According to one embodiment, the list or database of gestures are associated with a particular instruction or command.

Other gesture recognition methods, algorithms, and systems are known in the art. These methods, algorithms, and systems can benefit from the computationally-efficient identification of background and foreground pixels prior to or as a component of gesture recognition.

Figure 7:
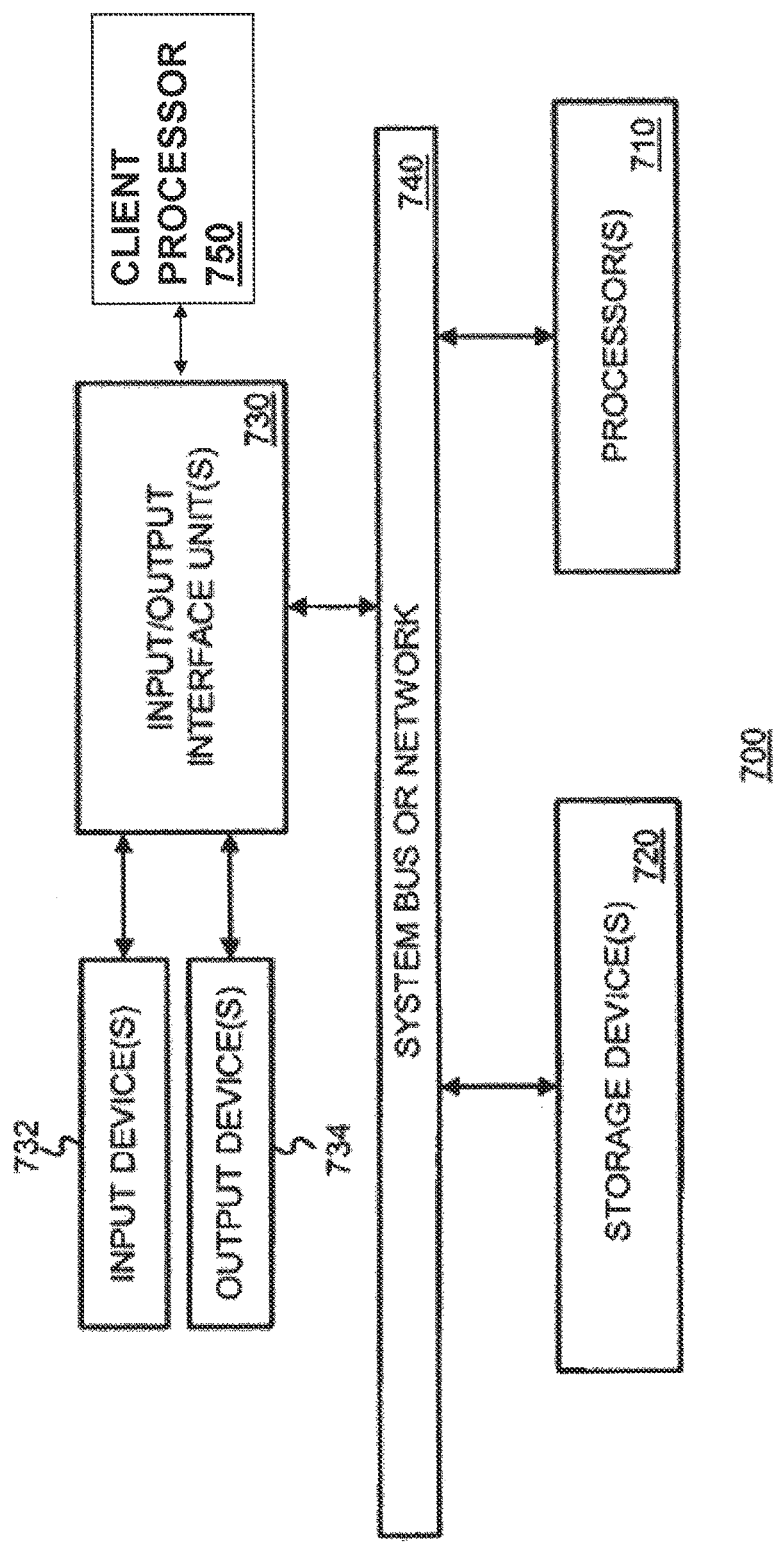
FIG. 7 is a block diagram illustrating a system that can be used to perform at least some of the various operations according to an embodiment.

FIG. 7 is a block diagram illustrating a system that can be used to perform at least some of the various operations described above. The processor(s) 710 may be server processor(s), and may include one or more microprocessors or processing circuits. The bus or network 740 may be a system bus, or the Internet. The storage device 720 may include system memory, such a read only memory (ROM) and/or random access memory (RAM). The storage device 720 can include any suitable type of storage including, for example, a hard disk drive for reading from and writing to a hard disk, a magnetic disk drive for reading from or writing to a (e.g., removable) magnetic disk, an optical disk drive for reading from or writing to a removable (magneto-) optical disk such as a compact disk or other (magneto-) optical media, or any other type of storage medium.

A user may enter commands and information into a user terminal such as a smart TV module, a personal computer, or a mobile device, through input device 732, such as a keyboard and pointing device (e.g., a mouse), or a video camera. Other input devices such as a microphone, a sensor, a touch input interface, a joystick, a game pad, a satellite dish, a scanner or the like, may also (or alternatively) be included. These and other input devices can be connected through an appropriate interface 730, to the network (e.g., the Internet) or a system bus 740, and to one or more client processor(s) 750, such as the processor of the user's personal computer. In accordance with implementations disclosed herein, the image processing can be performed on the client processor(s) 750, and the processing power and memory consumption can be confined substantially to the client side.

In one implementation, the user's personal computer includes non-transitory computer-readable medium having instructions stored thereon, which, when executed by the processor(s) 750, cause the processor(s) 750 to process the video images received from the input device 732 according to the methods described above. Video images with automatically-replaced background may be sent via the network 740 to other user terminals.

The output device 734 may include a monitor or other types of display devices, which can be connected to the network 740 and/or the client processor(s) 750 via an appropriate interface. In addition (or instead of) the monitor, the user terminal may include other (peripheral) output devices (not shown), such as speakers and printers for example. In some cases, output device 734 can include a component for providing one or more of a visual output, a haptic output, or an audio output.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

The claims should not be mad as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A computer-implemented method, comprising:
 receiving multiple images;
 for each image:
  generating, for each of multiple pixel granularity levels, multiple statistical models,
  generating, for each of a plurality of channels and based at least in part on the multiple statistical models, a compact probability model;
  aggregating the compact probability models to generate a single probability model,
  obtaining, from the single probability model and for each pixel in the image, a probability value that reflects a probability that the pixel is a background pixel,
  classifying each pixel in the image as a foreground pixel or a background pixel based on the probability value that is obtained for the pixel, and
  generating a foreground component that includes the pixels that are classified as foreground pixels; and
 performing a gesture recognition process using the respective foreground components of each of the multiple images.

2. The computer-implemented method of claim 1, further comprising generating, for each of the statistical models and for each of the plurality of channels, a per-channel probabilistic model that references a respective probability of each of a plurality of pixels being a background pixel,
 wherein generating the respective compact probability model for each channel comprises aggregating the per-channel probabilistic models for the channel.

3. The computer-implemented method of claim 1, wherein each of the multiple statistical models comprises a respective spatio-temporal (ST) histogram.

4. The computer-implemented method of claim 1, wherein the plurality of channels includes a red channel, a green channel, and a blue channel.

5. The computer-implemented method of claim 1, wherein classifying each pixel in the image as a foreground pixel or as a background pixel comprises comparing the probability value that is obtained for each pixel to a threshold probability value.

6. The computer-implemented method of claim 1, wherein performing the gesture recognition process comprises:
 identifying the respective foreground component of each of the multiple images;
 tracking the respective foreground component of each of the multiple images to determine a motion of the foreground component across the multiple images; and
 identifying a gesture that corresponds to the determined motion of the foreground component.

7. The computer-implemented method of claim 1, wherein generating the foreground component for each image comprises removing from the image each pixel that is classified as a background pixel.

8. The computer-implemented method of claim 1, further comprising, for each image, converting the compact probability model of the image to a bitset mask in which each pixel in the image is represented by a single bit that indicates whether the corresponding pixel is classified as a foreground pixel or a background pixel.

9. The computer-implemented method of claim 1, wherein performing the gesture recognition process comprises identifying a particular object from the respective foreground components of the multiple images, determining motion of the particular object, and correlating the motion of the particular object to a particular gesture associated with the particular object from among a plurality of gestures associated with the particular object.

10. The computer-implemented method of claim 1, wherein, for each image, the single probability model is generated by merging the compact probability models based on a weighted average of the compact probability models.

11. A non-transitory computer-readable medium having instructions stored thereon that, when executed by one or more processors, cause the one or more processors to perform operations comprising:
receiving multiple images;
for each image:
generating, for each of multiple pixel granularity levels, multiple statistical models,
generating, for each of a plurality of channels and based at least in part on the multiple statistical models, a compact probability model;
aggregating the compact probability models to generate a single probability model,
obtaining, from the single probability model and for each pixel in the image, a probability value that reflects a probability that the pixel is a background pixel,
classifying each pixel in the image as a foreground pixel or a background pixel based on the probability value that is obtained for the pixel, and
generating a foreground component that includes the pixels that are classified as foreground pixels; and
performing a gesture recognition process using the respective foreground components of each of the multiple images.

12. The computer-readable medium of claim 11, wherein the operations further comprise generating, for each of the statistical models and for each of the plurality of channels, a per-channel probabilistic model that references a respective probability of each of a plurality of pixels being a background pixel,
wherein generating the respective compact probability model for each channel comprises aggregating the per-channel probabilistic models for the channel.

13. The computer-readable medium of claim 11, wherein each of the multiple statistical models comprises a respective spatio-temporal (ST) histogram.

14. The computer-readable medium of claim 11, wherein the plurality of channels includes a red channel, a green channel, and a blue channel.

15. The computer-readable medium of claim 11, wherein performing the gesture recognition process comprises:
identifying the respective foreground component of each of the multiple images;
tracking the respective foreground component of each of the multiple images to determine a motion of the foreground component across the multiple images; and
identifying a gesture that corresponds to the determined motion of the foreground component.

16. The computer-readable medium of claim 11, wherein generating the foreground component for each image comprises removing from the image each pixel that is classified as a background pixel.

17. The computer-readable medium of claim 11, wherein the operations further comprise, for each image, converting the compact probability model of the image to a bitset mask in which each pixel in the image is represented by a single bit that indicates whether the corresponding pixel is classified as a foreground pixel or a background pixel.

18. The computer-readable medium of claim 11, wherein performing the gesture recognition process comprises identifying a particular object from the respective foreground components of the multiple images, determining motion of the particular object, and correlating the motion of the particular object to a particular gesture associated with the particular object from among a plurality of gestures associated with the particular object.

19. The computer-readable medium of claim 11, wherein, for each image, the single probability model is generated by merging the compact probability models based on a weighted average of the compact probability models.

20. An image processing system comprising one or more processors, the image processing system configured to perform operations comprising:
receiving multiple images;
for each image:
generating, for each of multiple pixel granularity levels, multiple statistical models,
generating, for each of a plurality of channels and based at least in part on the multiple statistical models, a compact probability model;
aggregating the compact probability models to generate a single probability model,
obtaining, from the single probability model and for each pixel in the image, a probability value that reflects a probability that the pixel is a background pixel,
classifying each pixel in the image as a foreground pixel or a background pixel based on the probability value that is obtained for the pixel, and
generating a foreground component that includes the pixels that are classified as foreground pixels; and
performing a gesture recognition process using the respective foreground components of each of the multiple images.

* * * * *